3,605,654
THERMAL DUCT RECIRCULATING
INCINERATOR
Henry L. Bowles, Jr., 4106 Center St.,
Houston, Tex. 77007
Filed May 4, 1970, Ser. No. 34,276
Int. Cl. F23g 5/12
U.S. Cl. 110—8A                                    5 Claims

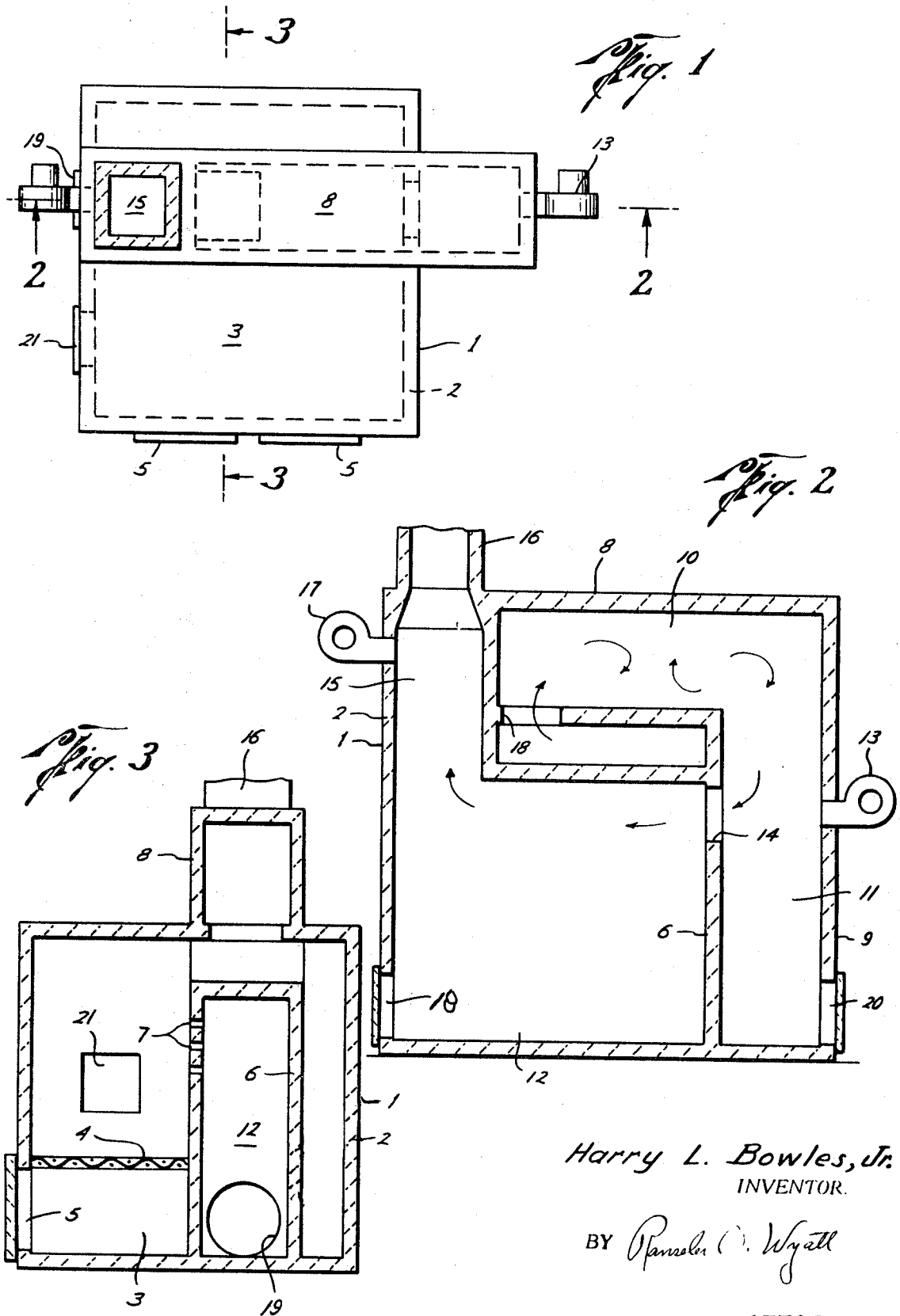

ABSTRACT OF THE DISCLOSURE

An incinerator for destroying waste material having a recirculating duct that maintains a high temperature causing fly ash spin out and complete oxidation of residual matter, maintaining the high temperature of the flue stream to the point of exit.

SUMMARY OF THE INVENTION

An incinerator having a primary chamber and a mixing chamber, a fly ash settling chamber and a thermal duct to consume the residual matter in the flue stream and to separate the fly ash from the flue stream.

BRIEF DESCRIPTION OF THE DRAWING

FIG. 1 is a top plan view of the device.
FIG. 2 is a side elevational view, taken on the line 2—2 of FIG. 1, and
FIG. 3 is a side elevational view taken on the line 3—3 of FIG. 1.

DESCRIPTION OF THE PREFERRED EMBODIMENT

In the drawings, the numeral 1 designates a housing having a metallic surface and a refractory insulation 2. The interior is provided with the primary burning chamber 3 into which the waste material to be burned is deposited upon a suitable grate, or refractory hearth, as 4, located in the chamber in accordance with the type of waste to be disposed of. Burners (not shown) may be mounted in the chamber 3 suitable for disposal of Incinerator Institute of America Classified Types O–1, 2, 3, 5, 6 wastes. A clean out opening means, such as the doors 5, 5 provide means for removing fly ash from the primary burning chamber.

In the rear of the primary burning chamber is the thermal duct 6 formed of a refractory material designed to retain extreme heat. Small holes, as 7, 7, extend through the side wall of the thermal duct adjacent the primary burning chamber 3, which assist in transferring heat to the interior of the thermal duct 6, but said holes are not large enough to permit fly ash to pass therethrough.

Mounted on the primary burning chamber housing, and superimposed over the thermal duct 6 is the mixing chamber housing 8, and the fly ash settling chamber housing 9, in which are located the mixing chamber 10 and the fly ash settling chamber 11 and the ash separation and oxidation chamber 12 within the duct 6. A burner 13 is mounted in the outer wall of the housing 9 and is located opposite the passageway 14 leading into the thermal duct 6.

An after burner chamber 15 is formed at the base of the stack 16 and a burner 17 is mounted therein.

As the waste matter is ignited in the chamber 3, the flue stream will rise over the top of the duct 6, and heat from the burning will pass through the openings 7 through the wall of the duct 6 and the temperature in the duct 6 will build up to an extreme heat, and the flow of the flue stream will be through the opening 18 into the mixing chamber 10. The turbulence of the flue stream in the chamber 10, intensified by the draft from the duct 6, will effect a dry scrubbing of the flue stream and as the flue stream passes into the fly ash settling chamber 11, the fly ash will spin out and settle to the bottom where it may be accumulated for removal through the cleanout opening 20. The burner 13, being positioned opposite the passageway 14 into the duct 6 will assist in completing the burning of the fly ash and residual matter in the flue stream and will aid in maintaining a draft through the duct 6. As the flue stream passes into the ash separation and oxidation chamber 12 of the duct 6, the super heat therein will bring about the destruction of the remaining residual matter and will cause the precipitation of the fly ash which will settle to the bottom and accumulate for removal through the clean out opening 19. The flue stream continues into the after burning chamber 15 where, in the event the optional burner 17 is employed, which would depend upon the type of waste being destroyed, the burner 17 will burn any remaining residual matter before the flue stream enters the stack 16, resulting in a smokeless emission.

A suitable barometric draft control (not shown) may be mounted in the stack, if desired, to complete the control of the flue stream.

What I claim is:

1. In an incinerator, an insulated housing, a primary chamber in said housing, a thermal duct in said housing in flow connection with said primary chamber, a mixing chamber in said duct and a fly ash settling chamber, a fly ash separation and oxidation chamber in flow connection with said settling chamber, and a burner in said duct, an after burning chamber in flow connection with said fly ash separation and oxidation chamber and a stack in flow connection with said after burning chamber.

2. The device defined in claim 1 wherein said thermal duct has a series of passageways formed in one wall thereof, said passageways being large enough to permit passage of hot gases therethrough, but not large enough to receive fly ash.

3. The device defined in claim 1 wherein said thermal duct is provided with means for generating an extremely high degree of heat, and thus stimulate the draft therethrough, and effect complete precipitation and oxidation of fly ash and residual matter in the flue steam.

4. The device defined in claim 1 wherein said chambers are arranged to provide a flue stream having sufficient turbulence to spin out the fly ash and having means for sufficient heat build up to maintain a high degree of temperature throughout the entire flue stream to the stack.

5. The device defined in claim 1 wherein the respective chambers are arranged at substantially right angles to each other, so that sufficient turbulence and dwell time are provided to accomplish complete spin out of the fly ash and complete oxidation of residual matter flowing therethrough in the flue stream.

References Cited

UNITED STATES PATENTS

| | | | |
|---|---|---|---|
| 2,847,950 | 8/1958 | Naulin | 110—18X |
| 3,310,009 | 3/1967 | Jacobs | 110—8 |
| 3,453,976 | 7/1969 | Burden, Jr., et al. | 110—18 |
| 3,446,163 | 5/1969 | Sharpe | 110—8 |

KENNETH W. SPRAGUE, Primary Examiner

U.S. Cl X.R.

110—18R

UNITED STATES PATENT OFFICE
CERTIFICATE OF CORRECTION

Patent No. 3,605,654          Dated September 20, 1971

Inventor(s) Harry L. Bowles, Jr.

It is certified that error appears in the above-identified patent and that said Letters Patent are hereby corrected as shown below:

In the heading to the printed specification, line 4, "Henry L. Bowles, Jr." should read -- Harry L. Bowles, Jr. --.

Signed and sealed this 6th day of June 1972.

(SEAL)
Attest:

EDWARD M. FLETCHER, JR.  
Attesting Officer

ROBERT GOTTSCHALK  
Commissioner of Patents